Patented June 23, 1953

2,643,268

UNITED STATES PATENT OFFICE 2,643,268

PURIFICATION OF ORTHO-METHOXY-PHENYLACETONE

Richard V. Heinzelmann, Kalamazoo, Mich., assignor to The Upjohn Company, Kalamazoo, Mich., a corporation of Michigan No Drawing. Application August 8, 1949,
Serial No. 109,233

9 Claims. (Cl. 260—590)

This invention relates to a method for the purification of ortho-methoxyphenylacetone and more particularly relates to a method of such purification which involves the use of an alkali-metal bisulfite.

A method for the synthesis of ortho-methoxyphenylacetone, a substance for which no synthesis or identifying constants have heretofore been published, is described and claimed in my copending application Serial No. 24,429, filed April 30, 1948, now Patent No. 2,557,051. According to the said copending application, ortho-methoxybenzaldehyde is condensed with nitroethane to give alpha - (ortho - methoxyphenyl) - nitropropene ($H_3C$—O—$C_6H_4$—CH=C($NO_2$)—$CH_3$), which is thereafter reduced and hydrolyzed, without isolation, to ortho-methoxyphenylacetone ($H_3C$—O—$C_6H_4$—$CH_2$—CO—$CH_3$) in excellent yields, the crude ortho-methoxyphenylacetone being preferably recovered from the reaction mixture by steam distillation. However, as is true with most organic reactions, the above transformations are not quantitative, there also appearing in the steam distillate up to about twenty percent of unreacted ortho-methoxybenzaldehyde, the exact amount being dependent upon reaction conditions and other variables.

Separation of ortho-methoxybenzaldehyde and ortho-methoxyphenylacetone by fractional distillation is difficult and expensive in that the boiling points of these substances at atmospheric pressure are about 243 and 260 degrees centigrade, respectively. Their high boiling points make fractionation at atmospheric pressure expensive, while, at subatmospheric pressures, the boiling points are sufficiently close together to require the employment of very efficient, and hence expensive, distillation equipment. Moreover, the presence of any unreacted ortho-methoxyphenylnitropropene in the crude product renders distillation a hazardous procedure.

It is an object of the present invention to provide a novel method for purifying ortho-methoxyphenylacetone. A further object is to provide such method which involves separation of ortho-methoxyphenylacetone from aldehydic impurities by formation of aldehyde-bisulfite addition complexes. Other objects will become apparent hereinafter.

It is known that aldehydes and many ketones form water-soluble addition compounds with alkali-metal bisulfites. Fieser and Fieser, Organic Chemistry, 206–209, D. C. Heath and Co., Boston (1944), show that acetone and ketones having the general formula $RCH_2CO.CH_3$, where- in R is alkyl, aryl, cycloalkyl, or substituted aryl, form bisulfite addition compounds. Tiffeneau, Compt. Rend. 150, 1181 (1910), and Fusco and Cagianelli, Farm. sci-e tec. (Pavia) 3, 125 (1948), Chem. Abstr. 43, 1741$^d$ (1949), report that p-methoxyphenylacetone (common trivial name, anisylacetone) reacts in all proportions with sodium bisulfite. Wacek, Berichte 77, 85 (1944), Chem. Absts. 39, 917 (1945), reported the isolation of 3,4-dimethoxyphenylacetone as its bisulfite complex. Likewise, phenylacetone reacts readily with alkali bisulfites, being soluble therein [Metzner, Liebig's Annalen 298, 378 (1897)].

It is therefore entirely unexpected that ortho-methoxyphenylacetone does not form an alkali bisulfite addition complex readily, nor in appreciable yield. This unexpected property of ortho-methoxyphenylacetone is utilized, according to the process of this invention, in the separation of ortho-methoxyphenylacetone from aldehydic impurities, as is more fully described hereinafter.

The process of this invention can be carried out by intimately contacting crude ortho-methoxyphenylacetone with an alkali-metal bisulfite, and thereafter separating the orthomethoxyphenylacetone from the bisulfite addition products of the impurities. The alkali-metal bisulfite may be used in finely divided solid form, but is preferably used in an aqueous solution. The exact quantity of bisulfite is not critical, but, for practical purposes, the amount used should be at least sufficient to react with all of the impurities, capable of forming bisulfite addition products, which are present. Prudent practice and economy indicate that a slight excess over stoichiometric quantity is preferred, but a smaller amount can be used if desired, although the purification is, of course, less satisfactory in such cases. An excess of about five times the quantity required theoretically to combine with all of the ortho-methoxyphenylacetone, as well as with all impurities present, has been tried and found not to remove a significant proportion of the ortho-methoxyphenylacetone. The concentration of the aqueous bisulfite, when a solution is used, is not critical and can be varied widely as is known in the art of preparing bisulfite addition products of many organic compounds. The reaction time and temperature, as well as the particular bisulfite used, are likewise not of critical importance, room temperature, for example, being entirely satisfactory.

The purification is preferably conducted under room conditions, allowing about an hour for the formation of the bisulfite addition product.

The alkali-metal bisulfites most commonly used by the art to prepare bisulfite addition products, such as sodium, potassium, or lithium bisulfites or meta-bisulfites, or the like, are suitable for the method of this invention, with sodium bisulfite being preferred. The mixture of the ortho-methoxyphenylacetone and impurities is conveniently dissolved in an organic solvent, immiscible with water, and thereafter contacted with the alkali-metal bisulfite or aqueous solution thereof. Representative organic solvents are benzene, toluene, chloroform, dichloroethane, diethyl ether, petroleum ether, and ethyl acetate.

Any known procedure for the separation of a solid from a liquid or for the separation of two liquid layers may be employed for separating the bisulfite addition product from the ortho-methoxyphenylacetone. When solid sodium bisulfite is employed, filtration is a preferred manner of removing the solid, while, where a bisulfite solution is employed, any conventional technique for the separation of two liquid layers may be used. The separation being in no way critical, any prior art procedure may be used.

By a single pass through the process of this invention, crude ortho-methoxyphenylacetone, having an index of refraction of 1.5290 at twenty degrees centigrade, containing (as shown by the table below) about sixteen percent of ortho-methoxybenzaldehyde, can be purified to a product having an index of refraction of about 1.5243 to about 1.5250, which corresponds to an aldehyde content of only about 2.5 to 4.5 percent. A ketone of this purity is satisfactory for some purposes, but, when greater purity is desired, another treatment by the method of the invention can reduce the aldehyde content to less than one percent.

TABLE

| Refractive index, 20 degrees centigrade | Percent ortho-methoxyphenylacetone | Percent ortho-methoxybenzaldehyde |
| --- | --- | --- |
| 1.5300 | 81 | 19 |
| 1.5290 | 84 | 16 |
| 1.5280 | 87 | 13 |
| 1.5270 | 90 | 10 |
| 1.5260 | 92.6 | 7.4 |
| 1.5250 | 95.6 | 4.4 |
| 1.5240 | 98.8 | 1.2 |
| 1.5235 | 100.0 | 0.0 |

While the present invention has been particularly illustrated with reference to the separation of ortho-methoxybenzaldehyde from ortho-methoxyphenylacetone, it is to be understood that the removal of any bisulfite-soluble impurities from ortho-methoxyphenylacetone, such as 2 - (ortho - methoxyphenyl) - 1 - nitropropene ($H_3C—O—C_6H_4—CH=C(NO_2)—CH_3$), also referred to herein as alpha-(ortho-methoxyphenyl)-nitropropene) and the like, are contemplated within the scope of this invention, which is not limited to the specific embodiments hereinafter described in the following examples.

PREPARATION 1.—PREPARATION OF CRUDE ORTHO-METHOXYPHENYLACETONE

Two hundred grams of ortho-methoxybenzaldehyde, 150 grams of nitroethane, and forty milliliters of n-butylamine were dissolved in 400 milliliters of toluene and the mixture heated under reflux in a flask equipped with a reflux condenser and suitable water-separation trap until collection of water ceased.

The water trap was then removed from the system and a stirrer introduced into the flask. Seven hundred fifty grams of finely divided iron, 1500 milliliters of water, and seven grams of ferric chloride were then added. The mixture was heated to boiling and, while stirring vigorously, 750 milliliters of concentrated hydrochloric acid was added dropwise over a period of four hours. The reaction mixture was subjected to steam distillation, eighteen liters of distillate being collected. The toluene layer was removed and the aqueous layer extracted with fresh toluene. The combined toluene extracts were fractionally distilled, yielding 247 grams of ortho-methoxyphenylacetone boiling at 126–132 degrees centigrade at a pressure of fourteen millimeters of mercury, $n_{20}^D$ of 1.5277

The product thus contained about 12.5 percent of ortho-methoxybenzaldehyde, as shown by the index of refraction.

*Example 1*

A toluene solution of 14.1 kilograms of crude ortho-methoxyphenylacetone, obtained as in Preparation 1, but not purified by distillation, having a refractive index at twenty degrees centigrade of 1.5280, was stirred for thirty minutes with 3000 grams of sodium bisulfite (100 percent excess) dissolved in eight gallons of water. The toluene layer was separated, washed three times with eight-gallon portions of water, and the solvent removed. The residual ortho-methoxyphenylacetone weighed 11,625 grams (95 percent recovery) and had a refractive index of 1.5248 which indicated the presence of four percent ortho-methoxybenzaldehyde, as an impurity.

*Example 2*

The material from Example 1 was again stirred with an aqueous solution of sodium bisulfite, the ketone washed with water and dried. The residual ortho-methoxyphenylacetone had a refractive index of 1.5240, which indicated a purity of 99 percent.

*Example 3*

A mixture of ortho-methoxyphenylacetone and ortho-methoxybenzaldehyde, composed of 85.5 percent ketone and 14.5 percent aldehyde, and having an index of refraction at twenty degrees centigrade of 1.5284, was shaken with a fifteen percent excess of solid sodium bisulfite over that required to react with the aldehyde. The solid was separated, the liquid organic layer washed with water and dried. The refractive index of the product was 1.5237, indicating the presence of about 0.6 percent ortho-methoxybenzaldehyde.

This example illustrates the process of forming the bisulfite in the absence of water and an organic solvent. Both ortho-methoxyphenylacetone and ortho-methoxybenzaldehyde are liquids at room temperature.

*Example 4*

A mixture of 97 grams of ortho-methoxyphenylacetone and twenty grams of ortho-methoxybenzaldehyde, having an index of refraction at twenty degrees centigrade of 1.5285, was dissolved in 100 milliliters of benzene and shaken for about 45 minutes with an aqueous solution of 19.1 grams of sodium bisulfite (25 percent excess over the amount theoretically necessary to react with all of the aldehyde) dissolved in 100 milliliters of water.

The aqueous and organic layers were separated and the benzene layer washed with water, dried, the benzene removed, and the residual product distilled. There was thus obtained 96 grams of product having an index of refraction of 1.5248, composed of 92.2 grams of pure ketone and 3.8 grams of aldehyde.

The above aqueous bisulfite layer was then washed with benzene, 50 milliliters of concentrated hydrochloric acid added, and the mixture extracted with benzene. The benzene layer was separated, washed with water, dried, and the benzene removed in an atmosphere of nitrogen. There was thus obtained 14.1 grams of crude ortho-methoxybenzaldehyde, a brown liquid having an index of refraction of 1.5630 at twenty degrees centigrade, which crystallized on seeding with a crystal of pure ortho-methoxybenzaldehyde.

*Example 5*

A mixture of 420.5 grams of ortho-methoxyphenylacetone and 82.7 grams of ortho-methoxybenzaldehyde, having an index of refraction of 1.5288 at twenty degrees centigrade, was dissolved in 450 milliliters of benzene and shaken with a solution of 95 grams of sodium bisulfite (fifty percent excess over that required to react with the aldehyde present) dissolved in 500 milliliters of water. The benzene layer was separated, washed with water, the benzene removed, and the residual oil distilled under subatmospheric pressure. There was obtained 440 grams of product, having an index of refraction of 1.5252 at twenty degrees centigrade, containing 418 grams of ortho-methoxyphenylacetone.

It is to be understood that the present invention is not to be construed as limited to the exact details of operation or exact compounds shown or described, as obvious modifications and equivalents will be apparent to one skilled in the art, and the invention is therefore to be limited only as defined in the appended claims.

Having thus described my invention, I claim:

1. A process for the purification of ortho-methoxyphenylacetone containing aldehyde impurity associated therewith to produce substantially aldehyde-free ortho-methoxyphenylacetone having a refractive index at twenty degrees centigrade of less than about 1.5260, which comprises contacting the crude ortho-methoxyphenylacetone with an alkali-metal bisulfite in excess of the amount required to form a bisulfite addition compound with the aldehyde impurity, which excess of alkali-metal bisulfite does not form any substantial amount of bisulfite addition compound with the ortho-methoxyphenylacetone, and subsequently separating the resulting aldehyde-bisulfite addition compound from the ortho-methoxyphenylacetone.

2. A process as defined in claim 1 in which the alkali-metal bisulfite is sodium bisulfite.

3. A process as defined in claim 1 in which the ortho-methoxyphenylacetone is separated from the aldehyde-bisulfite addition compound by extraction with water.

4. A process for the purification of ortho-methoxyphenylacetone containing minor proportions of aldehyde impurities including ortho-methoxybenzaldehyde to produce substantially aldehyde-free ortho-methoxyphenylacetone having a refractive index at twenty degrees centigrade of less than about 1.5260, which comprises contacting a solution of the crude ortho-methoxyphenylacetone in an organic solvent therefor, which solvent is substantially immiscible with water, with an alkali-metal bisulfite in excess of the amount required to form a bisulfite addition compound with the aldehyde impurities, which excess of alkali-metal bisulfite does not form any substantial amount of bisulfite addition compound with the ortho-methoxyphenylacetone, and subsequently separating the resulting organic layer containing the purified ortho-methoxyphenylacetone from the aldehyde bisulfite addition compound.

5. A process as defined in claim 4, in which the alkali-metal bisulfite is in aqueous solution, and the organic layer containing the purified ortho-methoxyphenylacetone is separated from the aqueous layer containing the aldehyde bisulfite addition compound.

6. A process as defined in claim 4, in which the alkali-metal bisulfite is sodium bisulfite.

7. A process as defined in claim 4, in which the water-immiscible solvent is a liquid solvent of the group consisting of benzene, toluene, chloroform, dichloroethane, diethyl ether, petroleum ether and ethyl acetate.

8. A process as defined in claim 4, in which the water-immiscible solvent is toluene.

9. A process for the purification of ortho-methoxyphenylacetone containing minor proportions of aldehyde impurities including ortho-methoxybenzaldehyde to produce substantially aldehyde-free ortho-methoxyphenylacetone having a refractive index at twenty degrees centigrade of less than about 1.5260, which comprises contacting a toluene solution of the crude ortho-methoxyphenylacetone with an aqueous solution of an alkali-metal bisulfite in excess of the amount required to form a bisulfite addition compound with the aldehyde impurities, which excess of alkali-metal bisulfite does not form any substantial amount of bisulfite addition compound with the ortho-methoxyphenylacetone, and subsequently separating the resulting toluene layer containing the purified ortho-methoxyphenylacetone from the aqueous layer containing the aldehyde bisulfite addition compound.

RICHARD V. HEINZELMANN.

References Cited in the file of this patent

UNITED STATES PATENTS

| Number | Name | Date |
|---|---|---|
| 2,288,281 | Huijser et al. | June 30, 1942 |
| 2,457,257 | Michael et al. | Dec. 28, 1948 |

OTHER REFERENCES

Tiffeneau, Compt. rend., vol. 150, pp. 1181–84 (1910).

Fieser et al., Organic Chemistry, pp. 206–09, Copyright 1944 by D. C. Heath and Co., Boston.